Figure 1:
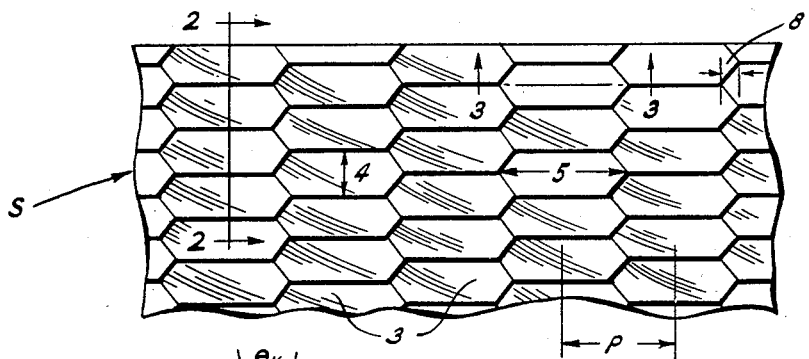

May 8, 1951        C. C. POND        2,552,455

PROJECTION SCREEN

Filed Jan. 14, 1949

INVENTOR.
CHESTER C. POND
BY
Brown, Denk & Lynnestvedt
AGENTS

Patented May 8, 1951

2,552,455

UNITED STATES PATENT OFFICE 2,552,455

PROJECTION SCREEN

Chester C. Pond, Melrose Park, Pa., assignor to Philco Corporation, Philadelphia, Pa., a corporation of Pennsylvania Application January 14, 1949, Serial No. 70,917

6 Claims. (Cl. 88—28.9)

This invention relates to projection screens, and while of general applicability, is especially concerned with projection screens adapted for use with television receivers, motion picture apparatus, and the like.

The present disclosure is a continuation-in-part of the subject matter disclosed and claimed in my copending application bearing Serial No. 620,443, filed October 5, 1945, now abandoned.

The invention has especial utility as applied to reflective projection screens having highly directional light-transmitting characteristics in vertical and horizontal planes. However, as set forth more fully in what follows, the principles of the invention are also applicable to screens having refractive optical characteristics.

Screens of the type with which the invention is concerned are adapted directionally to project the major portion of the incident light radiation, of an image focused thereon, outwardly over a viewing area of predetermined vertical height and horizontal width. Such screens have the feature of high optical efficiency in concentrating the incident radiation and, as a result, the screen may be viewed from any point within a predetermined viewing area, without the necessity of darkening the room or using a primary picture of such high brightness as to exceed the limits of practicality.

It is known to provide screens of the above type by forming a multiplicity of minute optical elements upon the surface of the screen, said elements serving as small field lenses, whereby to concentrate the incident radiation in the desired prescribed viewing area. Commonly, such screens are provided with minute elements either projecting from or recessed with respect to the plane of the screen surface. The recessed type is shown and described, by way of example, in the present disclosure.

Ideally, the elements employed are each defined by a bounding curve comprising a series of points having a logarithmic displacement with respect to the plane of the screen surface. Alternatively, an approach to such an ideal screen may be realized by using elements which are spherical in form. Both of the above types, however, have proven impractical to manufacture commercially, particularly in view of the extremely small dimensions involved, and especially where the viewing distance is relatively short. In fabricating screens—or the "matrix" or pattern therefor—employing either the logarithmically curved or spherical indentations, the indentations must be separately formed in the material by some discontinuous process, which results in the need for costly and laborious indexing operations in controlling the tool with respect to the work. The magnitude of this task will be appreciated when it is understood that the number of individual elements will be of the order of several million.

It is, therefore, a primary object of the present invention to provide a projection screen having minute, individual, optical elements of a configuration very closely approaching the theoretical ideal, which configuration may be inexpensively and readily produced.

To this general end, the present invention provides a screen having elements (preferably indentations) arranged thereover in rows. Each row has a bounding curve which comprises a portion of a trochoidal continuum, that is, viewed in cross-section, the aggregate of the individual curves comprising the elements in any row constitute a portion of a trochoidal continuum. As fully set forth hereinafter, such a continued trochoidal curve is readily susceptible of economic manufacture and, as pointed out above, represents a highly satisfactory practical approximation to the theoretically ideal curves. The word "trochoid," or the term "trochoidal continuum," as used in this specification, has reference to the prolate form of that family of curves, the invention being particularly characterized by the use of the bounding curve identified, specifically, as a "prolate cycloid." (See, for example, James' "Mathematics Dictionary," 1943, page 263.) It is to be understood that it is this particular trochoidal curve which is contemplated by the present invention.

More specifically, it is a feature to provide a screen having a reflective surface comprising a multiplicity of specularly reflective elements arranged in lines or rows, each element having major and minor axes, substantially in the plane of the screen surface, and at least two bounding curves, each of which subtends one of said axes, the aggregate of the curves subtending one of said axes comprising a portion of a trochoidal continuum, while the other of said curves may, for example, be of spherical or of logarithmic form.

Figure 2:
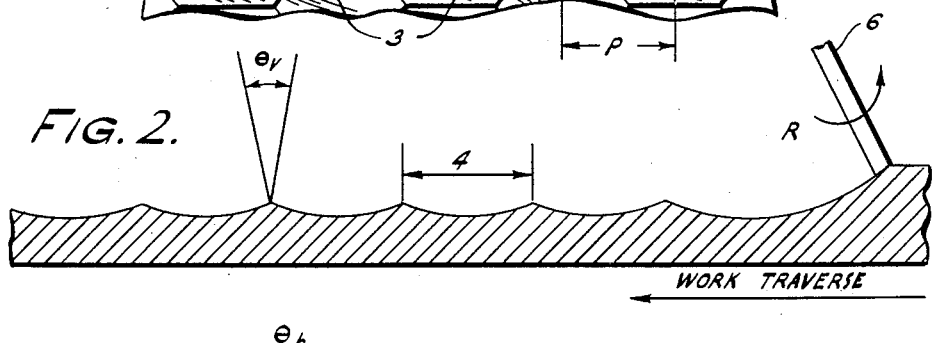
Figure 3:
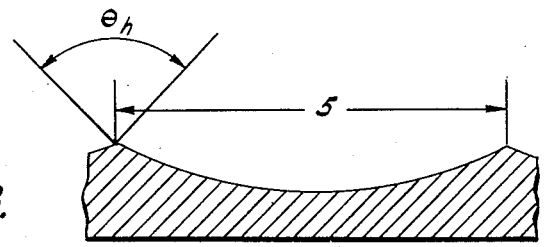
Figure 4:
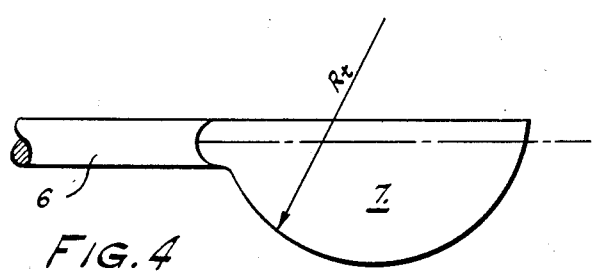
Figure 5:
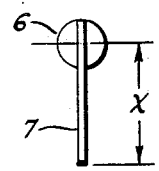
Figure 6:
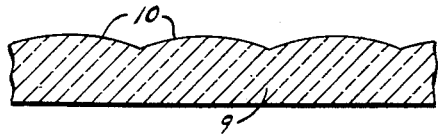

The invention extends further to certain novel features and arrangements hereinafter described and illustrated in the attached drawings, in which:

Figure 1 is a face view of a fragmentary portion, on a greatly enlarged scale, of a projection screen embodying the present invention;

Figures 2 and 3 are sectional views on a still larger scale, taken through a fragmentary portion of the screen, along the lines 2—2 and 3—3 of Figure 1, respectively, and illustrating one method by which the screen may be readily manufactured;

Figures 4 and 5 are side and end views, respectively, on an enlarged scale, of the cutting head of a tool which may be employed in the production of the screen of the present invention; and Figure 6 is a fragmentary, sectional illustration of another embodiment of the invention in which refractive optical characteristics are utilized.

In considering screens of the type with which the present invention is concerned, it should be understood that the absolute size of the individual optical elements forming the screen surface may be varied widely in accordance with the use to which the screen is to be put. The important conditions, however, are that the elements be of such size as to be beyond the resolving power of the eye at the minimum predetermined viewing distance, and that their relative dimensions be so chosen as to concentrate the incident radiation within the desired viewing area. Directionality in the vertical sense is determined by what is frequently referred to as the angle of vertical dispersion, identified hereinafter as $\theta_v$, while directionality in a generally horizontal plane is determined by $\theta_h$, that is, the angle of horizontal dispersion. It will be evident that the absolute size of the screen elements, when the screen is employed in a motion picture theater, may be very large as compared with their size when the screen is utilized in a home television receiver, for example. In either case, however, their size would be such that they would be beyond the resolving power of the eye, at the respective viewing distances employed, and, in the absence of special requirements with respect to the angles of dispersion, the proportionality between similar dimensions would remain equal. Also, it should be understood that, if the elements are reversed and project from the screen surface, they will also meet the requirements of the invention and produce the desired predetermined angles of vertical and horizontal dispersion.

Having particular reference to Figure 1 of the drawings, there is illustrated a fragmentary screen portion S having formed thereon a multiplicity of recessed specularly reflective elements 3 arranged in parallel rows or lines, the axis of one of said rows being coincident with line 2—2 of Figure 1. Individual elements resemble flattened ellipses, in plan form, and side portions of each element, substantially in the plane of the screen surface, are contiguous with side portions of adjacent elements; that is, for best results there should be no "land" areas between elements. The elements in any row are in staggered relation with respect to the elements in any adjacent row, whereby to achieve such contiguity.

Each element is hollowed or "dished" out of the plane of the screen surface, with the maximum excavation being in the central area thereof. The several elements are elongate in plan form, and, as is evident from Figures 2 and 3, have bounding curves subtending their major and minor axes, said curves lying in planes substantially at right angles to each other and to the plane of the screen surface. These curves define the dished contour referred to.

In particular accordance with the present invention, at least one of said bounding curves is trochoidal in form. In the embodiment illustrated, the curve along the minor axis of each element, that is, the shorter curve (see reference character 4 in Figure 2) is trochoidal; while the longer curve 5 takes the form of a circular arc. While it is important to the present invention that one of these curves be of trochoidal form, since from this novel form flows the unusual simplicity of manufacture, the concept is not limited to applying this form to a particular one of the two bounding curves.

It should be here noted that the elements preferably should have their longer dimensions 5 arranged horizontally, with respect to a predetermined viewing area, while the shorter dimensions 4 extend vertically. As will be clear to those familiar with this art, such orientation is followed when, as is commonly the case, it is desired to limit the height of the viewing area (determined by $\theta_v$) to a value smaller than the width thereof.

A highly satisfactory screen, based upon a six-foot minimum proper viewing distance, may be readily and inexpensively manufactured, in the manner now to be described; the following description being predicated upon a selection of 20° and 90° values for $\theta_v$ and $\theta_h$, respectively. While the screen could be cut directly in any readily workable material, the preferred method of manufacturing the screen of the present invention consists in machining a matrix in some workable material, such as wax, after which a suitable press tool or die of correct contour may be made therefrom by any of the well-known duplicating processes, such, for example, as electrodeposition. From this tool or die additional screens may be manufactured, for example by stamping or moulding. Nevertheless, it should be understood that the method hereinafter described results in a matrix which is in fact a screen of the present invention and, if supplied with a suitable reflective surface, it may be employed directly.

As shown in Figures 4 and 5, the tool includes a shank portion 6, adapted to be mounted substantially horizontally above the surface of the work, and about the center of which shank the tool is rotated. At its free end, the shank carries a blade 7, the cutting edge of which is shown as defined by an arc of a circle, but it may be defined by a logarithmic or other suitable curve, if preferred. As represented in Figure 2, the tool is located some convenient distance above the surface of the screen or matrix material and is caused to rotate in a counterclockwise direction about the shank portion 6, which overlies the surface of the work preferably in a plane parallel thereto. The material is fed beneath the tool in a direction opposite to the rotational direction of the tool, thereby forming the continued trochoidal curve of the present invention. This curve is represented in Figure 2, from which figure it is evident that, with the exception of the initial and terminal "gouge" in any row, the length of each section of the trochoidal curve 4 and the maximum excavation thereof, with respect to adjacent peaks, are equal for all the elements, the values of these dimensions depending upon the distance from the cutting edge of the tool to the center of rotation and upon the forward feed of the material, per revolution of the tool. As will be readily appreciated, traverse of the work is selected as a matter of convenience only, and an equivalent result could be accomplished by traversing the rotating tool with respect to the screen material.

The width 4 of each individual element thus represents the dimension of said element along the section line 2—2 of Figure 1. The length of each element, on the other hand, is represented by the dimension 5 appearing in Figure 3, this dimension being taken along the line 3—3 shown in Figure 1. The shape of the curve spanned by the dimension 5 is determined by the shape chosen for the face of the tool. As illustrated in Figure 4, the tool illustrated by way of example has a circular edge (the radius being given hereinafter) from which it follows that the curve spanned by the dimension 5 represents an arc of a circle. If desired, this curve may be made logarithmic in form, as above indicated, by defining the edge of the tool by a series of points having a logarithmic displacement with respect to the rotational axis of said tool. It will be understood that the shapes of the two curves above described, and the dimensions 4 and 5 are independent of the amount of screen material removed above the plane of the peaks appearing in the cross-sectional views.

After each row has been completed, in the manner just described, the tool is indexed with respect to the surface of the material in a direction along the major axis of any element of the row initially formed, a distance sufficient to result in the individual elements having major axes of the desired length. This indexing is, of course, accomplished by proper adjustment of the pitch of the machine. It will be observed that the elements in any row are staggered with respect to the elements in any adjacent row, a distance equal to half the minor axis of any element, i. e., the distance equal to one-half of the dimension 4. This is a further indexing operation which may be readily accomplished in a milling machine. By following such a sequence of operations, the rows are progressively formed by a rapid, continuous process, until the desired elements have been formed over the entire screen surface.

In the particular embodiment illustrated, and predicated upon the selection of 20° and 90° values for $\theta_v$ and $\theta_h$, respectively, elements of the proper size and shape will result when the machine is designed and set up as follows:

A tool cutting edge radius $R_t$ equal to 0.0196 inch should be employed, while the distance from the rotational axis of the tool to the boundary of the cutting edge (represented by X in Figure 5) should equal 0.0141 inch. The primary pitch of the machine, that is, the dimension indicated by the letter P appearing in Figure 1, is derived as follows:

$$P = 2R_t \sin \frac{\theta_h}{4}$$

Solving, it is found that the primary pitch should equal 0.015 inch. As pointed out above, the secondary pitch, i. e., the lateral shift between the elements of adjacent rows, is equal to one-half of the value desired for the dimension of the minor axis. This is equivalent to one-half of the dimension 4.

Further, the forward feed per revolution may be designated by:

$$F = X\theta_v$$

(where X is equal to the distance between the rotational axis of the tool and the cutting edge thereof, the value given hereinabove being 0.0141 inch. $\theta_v$ is measured in radians.) From the above, the forward feed per revolution is determined to be $F = 0.005$ inch.

Elements formed in accordance with the method above described and utilizing the values above developed, have been found to give good results, dispersing perpendicularly incident light rays through substantially a 90° angle, horizontally, and through a relatively narrow angle (20°) vertically.

While, as set forth hereinabove, the absolute value of the dimensions of the individual elements may be varied in accordance with the use to which the screen is put, elements formed in accordance with the foregoing specification are beyond the resolving power of the eye at the six-foot minimum predetermined viewing distance, and have relative dimensions suitable to concentrate the incident radiation within the desired viewing area. However, it should be understood that the proportionality between similar dimensions of various sized elements which may be employed must remain equal, if the desired values of $\theta_v$ and $\theta_h$ are to be retained. In the exemplary specification given above, the dimension 4 is equal, substantially, to 0.005 inch, while the dimension 5, along the major axis, is in the neighborhood of three times the value of the dimension 4. As will be apparent from inspection of Figure 3, the length of the individual elements is equal to the pitch of the machine (0.015 inch) plus the amount of overlap between two adjacent rows. This overlap is represented in Figure 1 by the reference numeral 8.

These exemplary dimensions are beyond the resolving power of the eye at the predetermined minimum proper viewing distance, which is known to be about one minute of arc for the normal eye. A rectangular screen having dimensions of 18 inches high by 24 inches wide has been found most satisfactory at such distance and, assuming the height of each individual element to be substantially equal to its width, there should be at least 860 elements along the smaller dimension and at least 1,150 along the larger. Actually, as brought out above, I prefer to employ elements the height of which is only one-third of their length and approximately 1,500 span the width of the screen. Evidently elements of such small size are well below the resolving power of the eye. The ratio between the height and length of the several elements, in addition to serving in the determination of the desired values of $\theta_v$ and $\theta_h$, is of special significance in television practice. The smaller the height dimension of the elements the greater the number thereof which will be spanned by each line of horizontal scan, with a consequent increase in line definition.

For exemplary purposes, the foregoing description emphasizes the applicability of the concepts of the invention to light-directing projection screens of the reflective type. However, it will be understood that the principles of the invention are also applicable to screens having refractive optical characteristics.

As set forth in the copending application of which the present disclosure is a continuation-in-part, the trochoidal curve of the invention may be applied in the form of individual optical elements which are either concave or convex, with respect to the body of material of which the screen is made. Similarly, as mentioned in said application, the techniques of the invention may be used to fabricate a screen directly, or to make a "matrix" or pattern from which screens may in turn be fabricated.

Convex elements and the last-mentioned technique are preferably used in providing the refractive embodiment shown in Figure 6, but it should be borne in mind that concave elements would also be useful in the refractive case. In such embodiment the screen, designated by the reference numeral 9, is of light-transmissive material (such, for example, as methyl methacrylate) and the convex elements 10 operate upon incident light, by refraction, as it passes through the screen.

The matrix from which such a screen is made—preferably by a pressing operation—is identical in appearance with the showings of Figures 1, 2 and 3 and this matrix is fabricated in complete accordance with the techniques fully set forth, supra. The refractive screen shown in Figure 6 is preferably pressed from the matrix and the elements 10, while preferably convex and suitable for use under refractive conditions, have a trochoidal curvature identical with that formed in the matrix. As above indicated, the absolute value of the dimensions of the individual elements 10 may be varied, if desired, in accordance with the use to which the screen is to be put and, accordingly, considerable variation is possible in the values of $\theta_v$ and $\theta_h$.

From the foregoing, it will be apparent that the present invention provides a projection screen which includes minute optical elements which, while of a novel configuration very closely approaching the theoretical ideal, may yet be inexpensively and readily produced in a substantially continuous process and without the need for costly and laborious operations.

I claim:

1. In a projection screen, a unitary relatively rigid sheet presenting a surface configured to provide a multiplicity of elements having optical power and being of such small size as to be beyond the visual resolving power of an observer at the minimum proper viewing distance, said elements being arranged in close adjacency over the surface of the screen, each element having substantially right-angled coordinate axes lying substantially in the plane of the screen surface, and individual elements being so shaped that a cross-section taken along at least one of said axes, in a plane perpendicular to the plane of the screen surface, has a bounding curve of prolate cycloidal form.

2. A projection screen comprising a unitary relatively rigid sheet presenting a surface configured to provide a multiplicity of elements having optical power and being of such small size as to be beyond the visual resolving power of an observer at the minimum proper viewing distance, said elements being arranged in lines with the elements in each line located in progressive adjacency, each element having major and minor axes substantially in the plane of the screen surface, and each element having at least two bounding curves each of which subtends one of said axes, said curves lying in planes substantially at right angles to each other and to the plane of the screen surface, said bounding curves further providing predetermined angles of horizontal and vertical dispersion, and the aggregate of the curves along one of said axes—with respect to the elements of any line—comprising a portion of a prolate cycoidal continuum.

3. In a projection screen, a unitary relatively rigid sheet presenting a reflective surface configured to provide a multiplicity of recessed reflective elements of such small size as to be beyond the visual resolving power of an observer at the minimum proper viewing distance, said elements being arranged in close adjacency over the surface of the screen, each element having major and minor axes arranged in substantially right-angular relation and lying substantially in the plane of the screen surface, and individual elements being so shaped that a cross-section taken along one of said axes, in a plane perpendicular to the plane of the screen surface, has a bounding curve of prolate cycloidal form.

4. A projection screen comprising a unitary relatively rigid sheet presenting a surface configured to provide a multiplicity of reflective elements of such small size as to be beyond the visual resolving power of an observer at the minimum viewing distance, said elements being arranged in lines with the elements in each line located in progressive adjacency, the individual elements in each line being so shaped that a cross-section taken along the axis of any such line, in a plane perpendicular to the plane of the screen surface, has a bounding curve comprising a portion of a prolate cycloidal continuum, the elements in any line being in staggered relation with respect to the elements in an adjacent line.

5. A projection screen comprising a unitary relatively rigid sheet presenting a surface configured to provide a multiplicity of recessed specularly reflective elements of such small size as to be beyond the visual resolving power of an observer at the minimum proper viewing distance, said elements being arranged in lines with the elements in each line located in progressive adjacency, and each element having at least one bounding curve lying in a plane substantially at right angles to the plane of the screen surface, the aggregate of said bounding curves—with respect to the elements of any line—comprising a portion of a prolate cycloidal.

6. A projection screen comprising a unitary relatively rigid sheet presenting a surface configured to provide a multiplicity of recessed specularly reflective generally ellipsoidal elements of such small size as to be beyond the visual resolving power of an observer at the minimum proper viewing distance, each element having major and minor axes substantially in the plane of the screen surface and individual elements being arranged in rows with the elements in each row arranged in progressive adjacency, and each element having at least two bounding curves each of which subtends one of said axes, said curves lying in planes substantially at right angles to each other and to the plane of the screen surface, said bounding curves providing predetermined angles of horizontal and vertical dispersion, the aggregate of the curves subtending one of said axes—with respect to the elements in any row—comprising a portion of a prolate cycloidal continuum.

CHESTER C. POND.

REFERENCES CITED

The following references are of record in the file of this patent:

UNITED STATES PATENTS

| Number | Name | Date |
| --- | --- | --- |
| 1,122,192 | Clark | Dec. 22, 1914 |
| 1,824,353 | Jensen | Sept. 22, 1931 |
| 1,854,864 | Semenitz | Apr. 19, 1932 |
| 2,132,904 | Martinez et al. | Oct. 11, 1938 |
| 2,440,963 | Luce | May 4, 1948 |